(12) United States Patent
Feng

(10) Patent No.: US 10,754,470 B2
(45) Date of Patent: Aug. 25, 2020

(54) INTERFACE CONTROL METHOD FOR OPERATION WITH ONE HAND AND ELECTRONIC DEVICE THEREOF

(71) Applicant: NANNING FUGUI PRECISION INDUSTRIAL CO., LTD., Nanning (CN)

(72) Inventor: Kun-Chuan Feng, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/693,722

(22) Filed: Nov. 25, 2019

(65) Prior Publication Data

US 2020/0089365 A1    Mar. 19, 2020

Related U.S. Application Data

(63) Continuation of application No. 15/336,916, filed on Oct. 28, 2016, now Pat. No. 10,572,054.

(51) Int. Cl.
*G06F 3/041* (2006.01)
*G06F 3/0488* (2013.01)
*G06F 3/0481* (2013.01)
*G06F 3/0484* (2013.01)

(52) U.S. Cl.
CPC .......... *G06F 3/0416* (2013.01); *G06F 3/0412* (2013.01); *G06F 3/0488* (2013.01); *G06F 3/04812* (2013.01); *G06F 3/04847* (2013.01); *G06F 2203/04105* (2013.01); *G06F 2203/04805* (2013.01); *G06F 2203/04806* (2013.01)

(58) Field of Classification Search
CPC ......... G06F 2203/04105; G06F 3/0412; G06F 3/0416; G06F 3/04847
See application file for complete search history.

(56) References Cited

U.S. PATENT DOCUMENTS

| | | | | |
|---|---|---|---|---|
| 7,692,629 | B2 * | 4/2010 | Baudisch | G06F 3/0488 345/157 |
| 2008/0204476 | A1 * | 8/2008 | Montague | G06F 3/04845 345/661 |
| 2011/0095993 | A1 * | 4/2011 | Zuverink | G06F 3/04847 345/173 |
| 2012/0056840 | A1 * | 3/2012 | Benko | G06F 3/04812 345/173 |

FOREIGN PATENT DOCUMENTS

| | | |
|---|---|---|
| CN | 102945136 A | 2/2013 |
| CN | 104035716 A | 9/2014 |

\* cited by examiner

*Primary Examiner* — Ram A Mistry
(74) *Attorney, Agent, or Firm* — ScienBiziP, P.C.

(57) ABSTRACT

A method for controlling an interface in an electronic device includes a touch-sensitive display. A first predefined user action is detected, together with a second user action, and the electronic device defines and positions a cursor on the display screen. A first display area which contains soft buttons from a certain part of the display screen (depending on cursor position) is projected within or around the portion of the display within reach of a user's thumb, for one-handed operation. The soft buttons in such first display area can be shrunk or enlarged in size as user requires.

8 Claims, 9 Drawing Sheets

INTERFACE CONTROL METHOD FOR OPERATION WITH ONE HAND AND ELECTRONIC DEVICE THEREOF

CROSS-REFERENCE TO RELATED APPLICATIONS

The application is a continuation of and claims priority under 35 U.S.C. § 120 to U.S. application Ser. No. 15/336,916, filed Oct. 28, 2016, the entire contents of which are incorporated by reference herein.

FIELD

The subject matter herein generally relates to computer technologies, and more particularly to an interface control method and an electronic device using the same.

BACKGROUND

In order to provide a better visual experience, touch-sensitive displays of electronic devices have become larger. However, an electronic device with a large touch-sensitive display cannot be easily controlled by one hand of a user.

Thus, it is important for users to provide a more convenient method for providing control operations to the electronic device.

BRIEF DESCRIPTION OF THE DRAWINGS

Implementations of the present technology will be described, by way of example only, with reference to the attached figures, wherein.

DETAILED DESCRIPTION

Figure 1:
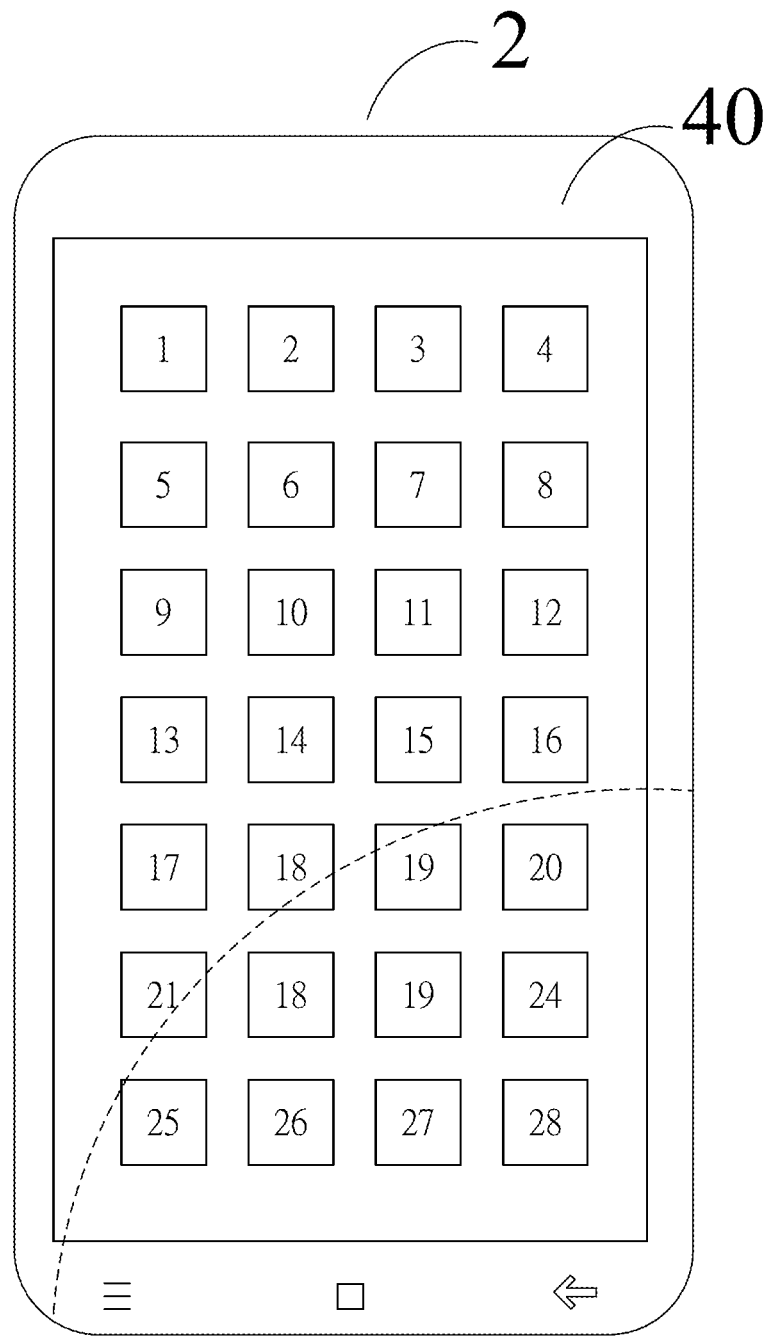
FIG. 1 illustrates an exemplary embodiment of a graphical user interface (GUI) for an electronic device.

It will be appreciated that for simplicity and clarity of illustration, where appropriate, reference numerals have been repeated among the different fingers to indicate corresponding or analogous elements. In addition, numerous specific details are set fourth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when used, means "including, but not necessarily limited to"; it specifically indicates open-ended inclusion or membership in a so-described combination, group, series, and the like.

Exemplary embodiments of an interface control method and an electronic device utilizing the same will be described in more detail.

FIG. 1 illustrates one exemplary embodiment of a graphical user interface (GUI) for an electronic device 2. Controlling the electronic device 2 with one-handed (e.g., right-hand) touches can be inconvenient or seriously degrade efficiency for most users, because most users can only touch an area below the dotted line illustrated in FIG. 1.

Figure 2:
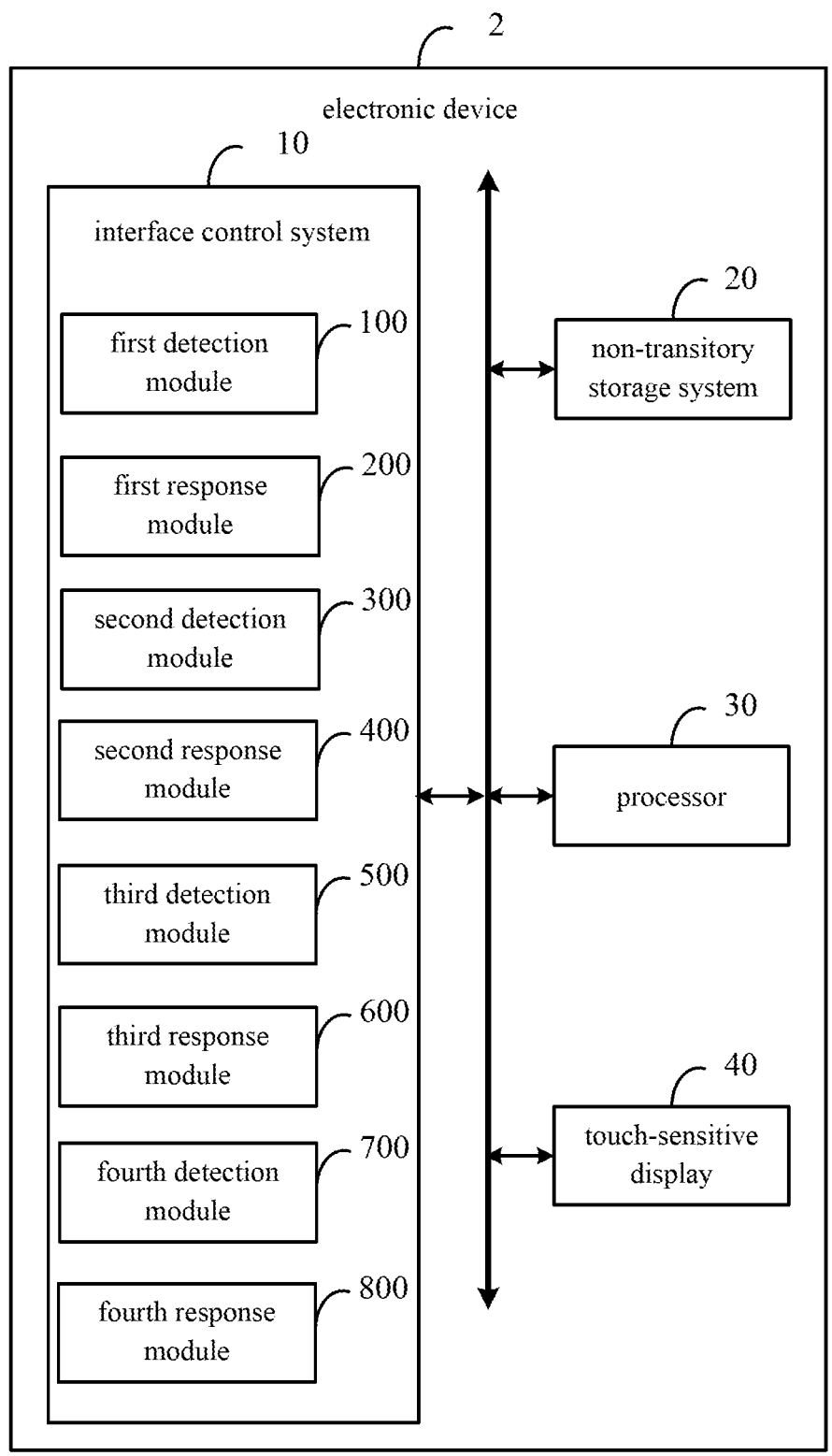
FIG. 2 illustrates a block diagram of an exemplary embodiment of functional modules of an electronic device.

FIG. 2 illustrates one exemplary embodiment of functional modules of an electronic device 2. Exemplary embodiments of the electronic device 2 may include laptop computers, smart mobile phones, tablet personal computers, and the like. The electronic device 2 includes an interface control system 10, a non-transitory storage system 20, at least one processor 30, and a touch-sensitive display 40. The touch-sensitive display 40 displays and receives touch inputs from a user. An interface control system 10 controls the interface operations on the electronic device 2 in response to touch inputs. Interface or display interface can refer to window, display window, display region, or display area.

The interface control system 10 includes a first detection module 100, a first response module 200, a second detection module 300, a second response module 400, a third detection module 500, a third response module 600, a fourth detection module 700, and a fourth response module 800. The function of each of the modules 100~800 are executed by one or more processors (e.g. by the processor 30). The non-transitory storage system 20 can store code and data.

The first detection module 100 detects a first predefined user action on the touch-sensitive display 40. The first predefined user action includes, for example, a key press on at least one soft key or on a physical key, or a predefined user gesture.

Figure 3:
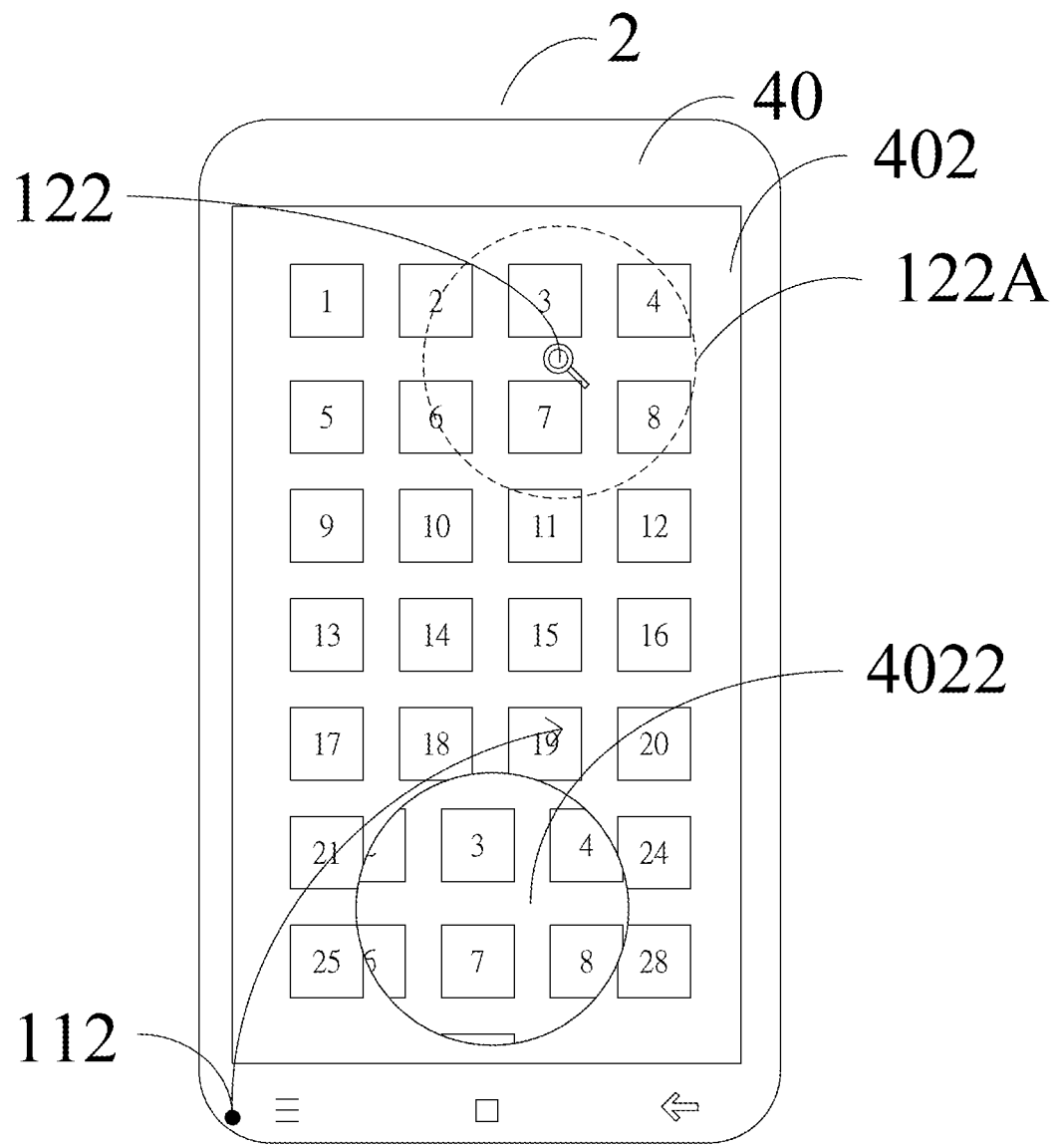
FIG. 3 illustrates a schematic diagram of an exemplary embodiment of a one-handed operation.

In the exemplary embodiment, a first predefined user action may be defined by two consecutive actions, such as a first contact with the touch-sensitive display 40 and a movement thereof. Thus, a first predefined user action is detected when a first contact and a motion of the first contact are detected. FIG. 3 illustrates an exemplary embodiment for detecting a first predefined user action, wherein the first detection module 100:

1) detects the first contact and determines whether the position of the first contact is within a predetermined edge area of the touch-sensitive display 40 (e.g., 112);

2) detects the motion of the first contact and determines whether the movement of the first contact is within a predetermined display area 402 of the touch-sensitive display 40.

The first detection module 100 determines whether a first predefined user action is detected when operations 1) and 2) are completed with by a user.

Figure 4:
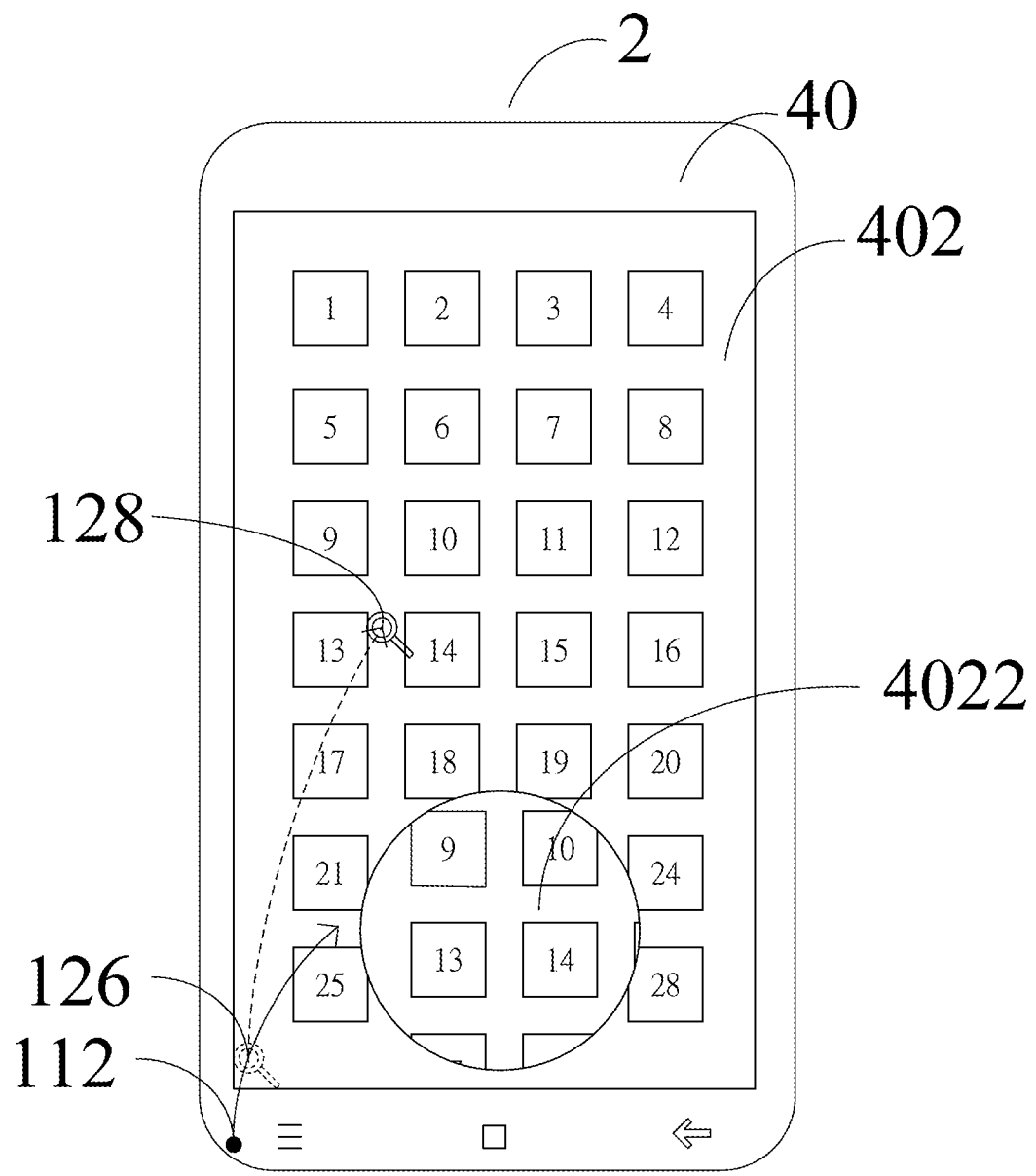
FIG. 4 illustrates a schematic diagram of another exemplary embodiment of a one-handed operation.

The predetermined edge area of the touch-sensitive display 40 is any area(s) which can be touched by a user's thumb in a one-handed operation. The predetermined edge area of the touch-sensitive display 40 can also be preset by hardware/software, or can be set by users (through, for example, a graphical user interface or hardware interface, both having settings or configuration capabilities).

Wherein when the first predefined user action is detected, the first response module 200, defines a visible cursor (e.g., magnifying glass icon illustrated in FIG. 3) on the touch-sensitive display 40. The initial position of the cursor may be preset to be located at/by an intersection between the path of the first predefined user action and border of the predetermined display area 402. In one exemplary embodiment, referring to FIG. 4, the first response module 200 defines a cursor at a lower-left corner position 126 of the predetermined display area 402 of the touch-sensitive display 40, and the cursor is moved to a third target position 128 according to the user's gesture.

In one exemplary embodiment, the touch-sensitive display 40 may be a pressure touch-sensitive display. The first response module 200 is able to adjust parameters of the cursor (e.g., size, color, velocity, acceleration) according to the amount of pressure on the touch-sensitive display 40.

The second detection module 300 detects a second user action on the touch-sensitive display 40. In the exemplary embodiment, the first predefined user action and the second user action may be defined by two consecutive actions in a single sliding touch operation. Thus, the first response module 200 defines the cursor once the first predefined user action is detected by the first detection module 100. Then the second detection module 300 begins the process of detecting the second user action.

In another exemplary embodiment, the first predefined user action and the second user action may be two separate and independent actions based on a liftoff event (e.g. first user action) and a re-contact event (e.g. second user action).

Wherein when the second user action is detected, the second response module 400 moves the cursor to a first target position (e.g., 122) of the touch-sensitive display 40, and projects a first display area 122A to a temporary-defined one-handed operation area 4022 within reach of the user's thumb. The first display area 122A is located within a predetermined range around the first target position 122. The user can control any function icon or menu of the electronic device 2 by the one-handed operation area 4022. For example, referring to FIG. 3, a soft button 7 in the first display area 122A (hereinafter, SB 7$^1$) is projected into the one-handed operation area 4022. A projection soft button 7 (hereinafter, SB 7$^2$), corresponding to SB 7$^1$, is displayed in the one-handed operation area 4022. The user can control an application associated with the SB 7$^1$ through pressing/touching/contacting the SB 7$^2$. The cursor is moved along the path of the second user action (i.e., the path of the movement of the first contact within the predetermined display area 402). In one exemplary embodiment, the one-handed operation area 4022 may be defined at the same time as the cursor, or may be defined at the end of the second user action.

In one exemplary embodiment, sensitivity of the cursor can be adjusted by users. The cursor can be dragged in a particular direction specified by a vector of the second user action (i.e., finger movement), and having a magnitude proportional to the velocity of movement of the finger.

In one exemplary embodiment, there is at least one software button on the touch-sensitive display 40 which can enable the electronic device 2 to enter into an operation mode (e.g., a moving mode, a zoom-in/zoom-out mode).

In the moving mode, the third detection module 500 detects a third user action, wherein the third action includes a second contact and movement of the second contact, the position of the second contact being located at an edge of the one-handed operation area 4022.

Wherein when the third user action is detected, the third response module 600 moves the cursor to a second target position 124 of the touch-sensitive display 40 and projects a second display area 124A to the one-handed operation area 4022. The projected second display area 124A is located within a predetermined range around the second target position 124.

Figure 5:
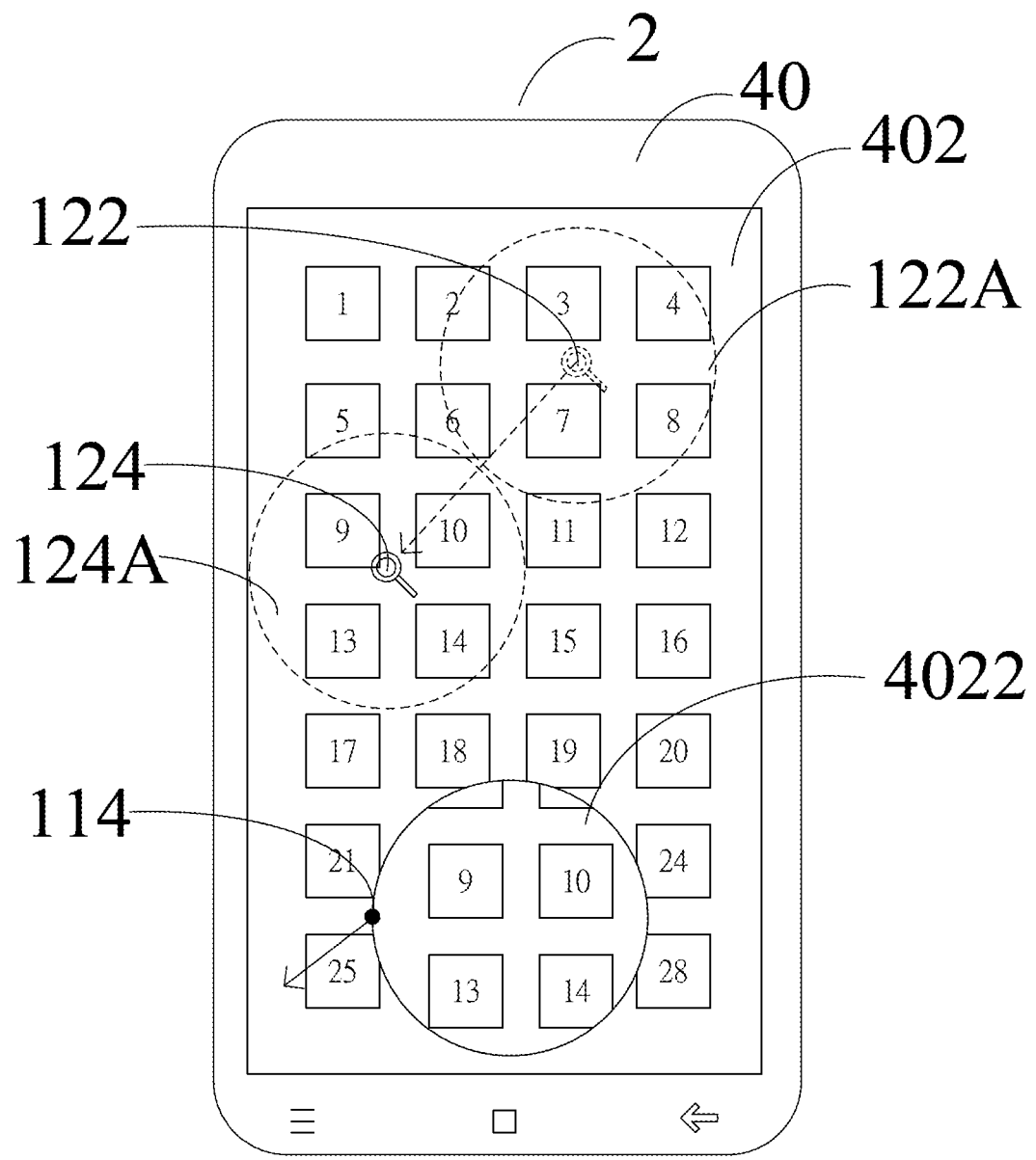
FIG. 5 illustrates a schematic diagram of an exemplary embodiment of a one-handed operation.

In one exemplary embodiment, referring to FIG. 5, when the third detection module 500 detects a second contact at a position (e.g., 114) located at the edge of the one-handed operation area 4022, the third response module 600 adjusts the color of the edge of the one-handed operation area 4022. After detecting the second contact at the position 114, the third detection module 500 detects continuing movement of the second contact, and the third response module 600 moves the cursor from the first target position 122 to the second target position 124 according to the path of the movement of the second contact.

In the zoom-in/zoom-out mode, the fourth detection module 700 detects a fourth user action, wherein the fourth action comprises a third contact and movement of the third contact, the position of the second contact being located at an edge of the one-handed operation area 4022.

Wherein when the fourth user action is detected, the fourth response module 800 adjusts display size of objects in user interface in the one-handed operation area 4022.

Figure 6:
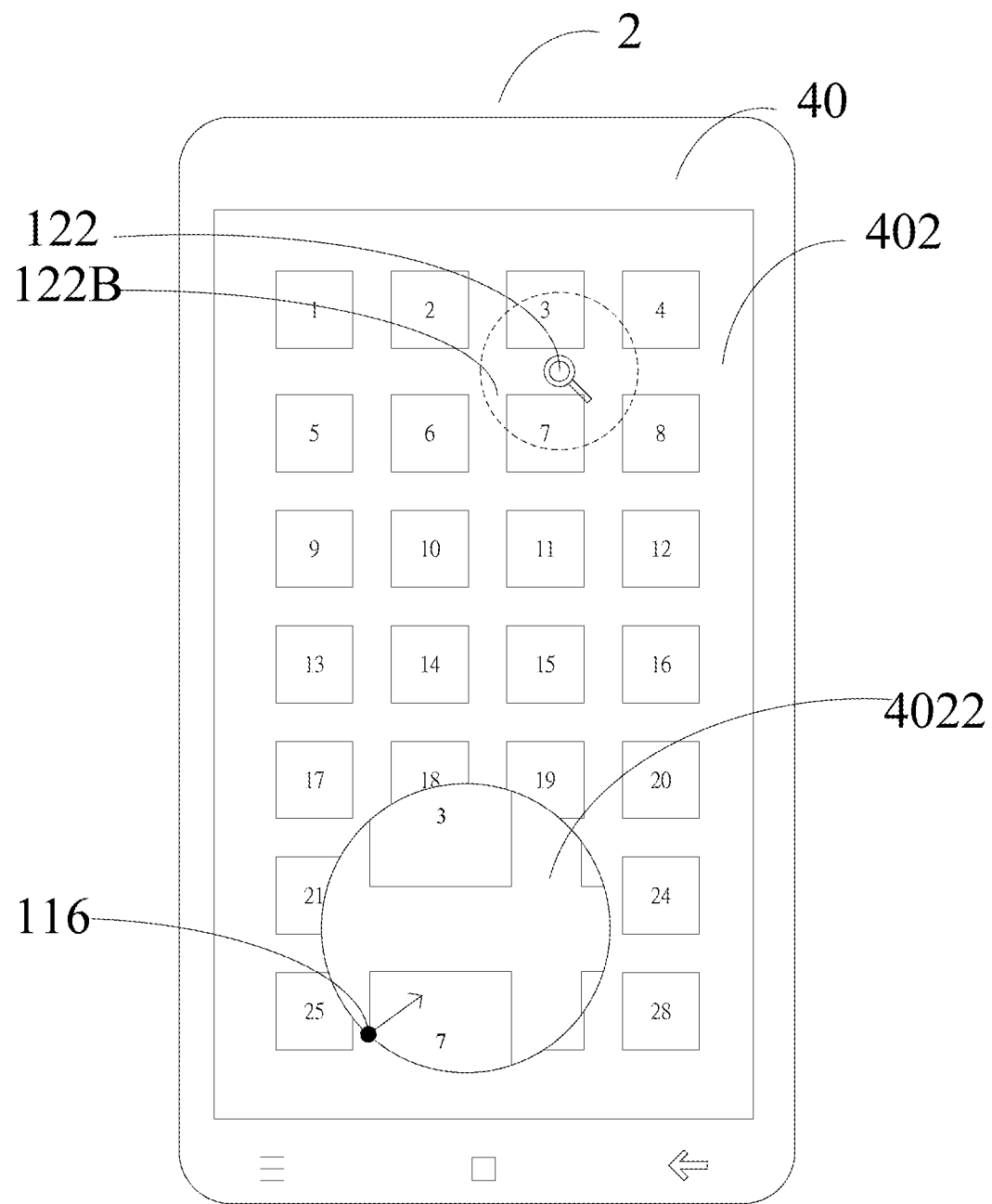
FIG. 6 illustrates a schematic diagram of an exemplary embodiment of a one-handed operation under a zoom-in/zoom-out mode.
Figure 7:
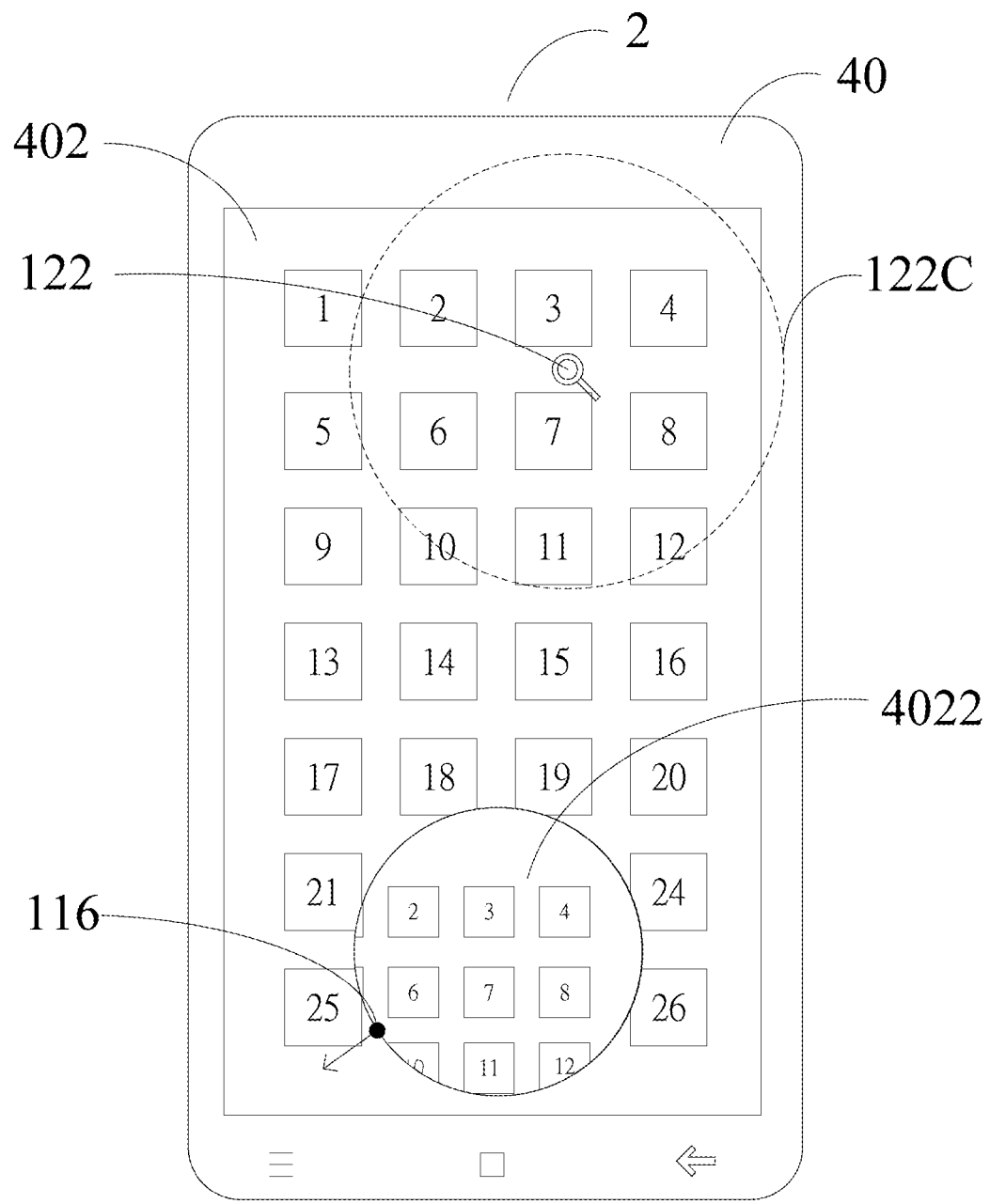
FIG. 7 illustrates a schematic diagram of another an exemplary embodiment of a one-handed operation under a zoom-in/zoom-out mode.

In an exemplary embodiment, referring to FIGS. 6 and 7, when the fourth detection module 700 detects a third contact at a position (e.g., 116) located at the edge of the one-handed operation area 4022, the fourth response module 800 adjusts the color of the edge of the one-handed operation area 4022. After detecting the third contact at the position 116, the fourth detection module 700 detects continuing movement (inward or outward) of the third contact. The fourth response module 800 adjusts display size of objects in user interface in the one-handed operation area 4022. Referring to area 122B illustrated in FIG. 6, if the fourth response module 800 applies a zoom-in (increasing display size of objects in the user interface in the one-handed operation area 4022), the one-handed operation area 4022 is capable of accommodating a smaller projection area. That is, the one-handed operation area 4022 is capable of accommodating fewer objects in the user interface. A larger display size of objects in the user interface in the one-handed operation area 4022 can be required for visually challenged users. Referring to area 122C illustrated in FIG. 7, if the fourth response module 800 applies a zoom-out (decreasing display size of objects in user interface in the one-handed operation area 4022), the one-handed operation area 4022 is capable of accommodating a larger projection area. That is, the one-handed operation area 4022 can then accommodate more objects in the user interface.

Figure 8:
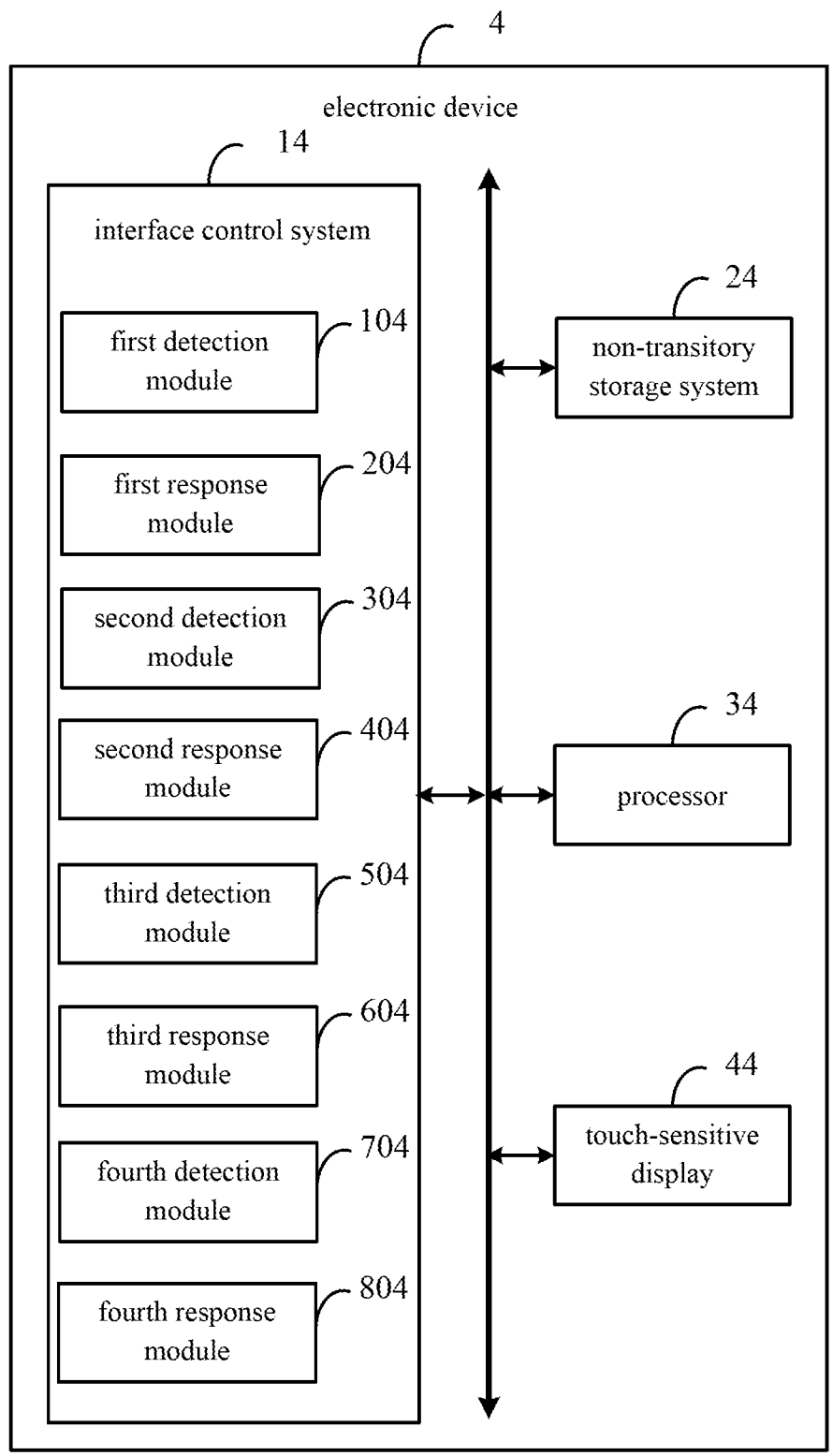
FIG. 8 illustrates a block diagram of another exemplary embodiment of functional modules of an electronic device.

FIG. 8 illustrates a block diagram of another exemplary embodiment of functional modules of an electronic device 4. In the exemplary embodiment, the electronic device 4 includes an interface control system 14, a non-transitory storage system 24, at least one processor 34, and a touch-sensitive display 44. The interface control system 14 includes a first detection module 104, a first response module 204, a second detection module 304, a second response module 404, a third detection module 504, a third response module 604, a fourth detection module 704, and a fourth response module 804. The modules 504-804 correspond to and are similar to the modules 500-800 illustrated in FIG. 2. Modules 104-404 are detailed as follows.

The first detection module 104 detects a first predefined user action on the touch-sensitive display 44.

Wherein when the first predefined user action is detected, the first response module 204 defines a cursor and a one-handed operation area on the touch-sensitive display 44.

The second detection module 304 detects a second user action on the touch-sensitive display 44, the first predefined user action and the second user action may be defined by two consecutive actions in a single sliding touch operation.

Wherein when the second user action is detected, the second response module 404 moves the cursor to a first target position of the touch-sensitive display 44 and projects a first display area to the one-handed operation area. The projected first display area is located within a predetermined range around the first target position.

Figure 9:
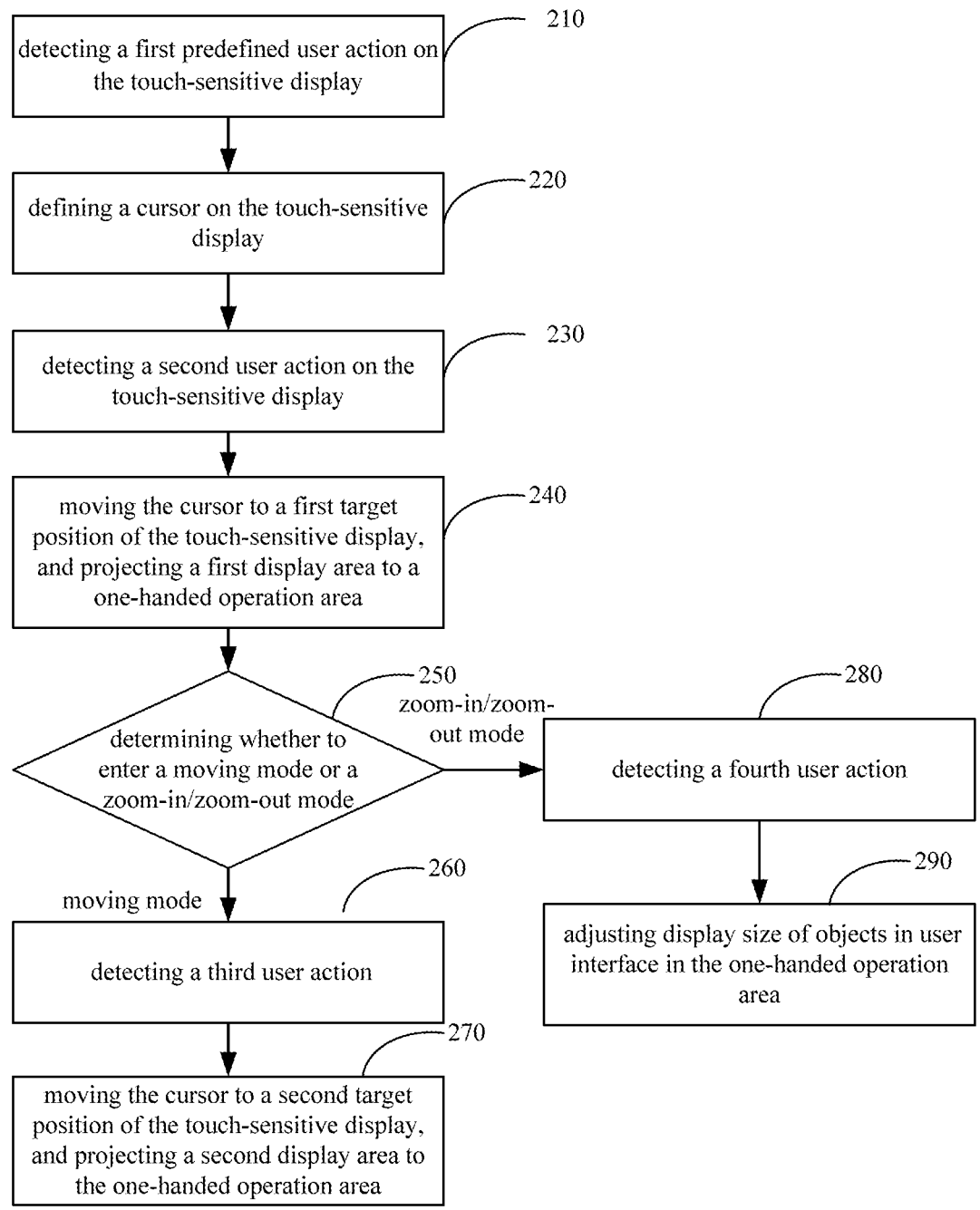
FIG. 9 illustrates a flowchart of an exemplary embodiment of an interface control method.

FIG. 9 illustrates a flowchart of an exemplary embodiment of an interface control method. The interface control method is provided by way of example, as there are a variety of ways to carry out the method. The method described below can be carried out using the electronic device 2 illustrated in FIG. 2, for example, and various elements of these fingers are referenced in explaining the processing method. The electronic device is not to limit the operation of the method, which also can be carried out using other devices. Each step shown in FIG. 9 represents one or more processes, methods, or subroutines, carried out in the exemplary processing method. Additionally, the illustrated order of blocks is by example only and the order of the blocks can change. The interface control method begins at block 210.

At block 210, the electronic device detects a first predefined user action on the touch-sensitive display. In the exemplary embodiment, a first predefined user action may be defined by two consecutive actions, such as a first contact with the touch-sensitive display 40 and a movement thereof. The block 210 further includes: detects a position of the first contact and determines whether the position is within a predetermined edge area of the touch-sensitive display; and detects the movement of the first contact and determines whether the movement of the first contact is into a predetermined display area of the touch-sensitive display.

At block 220, the electronic device defines a cursor on the touch-sensitive display when the first predefined user action is detected.

At block 230, the electronic device detects a second user action on the touch-sensitive display. In the exemplary embodiment, the first predefined user action and the second user action are defined by two consecutive actions in a single sliding touch operation.

At block 240, wherein when the second user action is detected, the electronic device moves the cursor to a first target position of the touch-sensitive display, and projects a first display area to a one-handed operation area. The first display area is located within a predetermined range around the first target position.

At block 250, the electronic device determines whether to enter into a moving mode or a zoom-in/zoom-out mode. If the moving mode, the flowchart goes to block 260; if the zoom-in/zoom-out mode, the flowchart goes to block 280.

At block 260, the electronic device detects a third user action, wherein the third action comprises a second contact and movement of the second contact, position of the second contact being located at an edge of the one-handed operation area.

At block 270, wherein when the third user action is detected, the electronic device moves the cursor to a second target position of the touch-sensitive display, and projects a second display area to the one-handed operation area, wherein the projected second display area is located within a predetermined range around the second target position.

At block 280, the electronic device detects a fourth user action, wherein the fourth action comprises a third contact and movement of the third contact, position of the second contact being located at the edge of the one-handed operation area.

At block 290, wherein when the fourth user action is detected, the electronic device adjusting display size of objects in user interface in the one-handed operation area.

It's noted, exemplary embodiments of the present application describe the method or the electronic device using the same in one-handed operation based on right hand. The present application also be adapt to other conditions, for example, one-handed operation based on left hand in a portrait mode (e.g., vertical mode), one-handed operation based on left/right hand in a landscape mode (e.g., a horizontal mode) and etc.

It's noted, exemplary embodiments of the present application can terminate the one-handed operation mode, the zoom-in/zoom-out mode and the moving mode by soft/hard button(s) or movement of contact.

It should be emphasized that the above-described exemplary embodiments of the present disclosure, including any particular embodiments, are merely possible examples of implementations, set fourth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device configured for one-hand operation comprising:
   a touch-sensitive display;
   at least one processor;
   a non-transitory storage system coupled to the at least one processor and configured to store one or more programs to be executed by the at least one processor, the one or more programs including instructions for:
      detecting a first predefined user action on the touch-sensitive display;
      wherein when the first predefined user action is detected, defining a one-handed operation area on the touch-sensitive display and displaying a cursor located outside the one-handed operation area;
      detecting a second user action on the touch-sensitive display, wherein the first predefined user action and the second user action are defined by two consecutive actions in a single touch operation; and wherein when the second user action is detected, moving the cursor from an initial position to a first target position located outside the one-handed operation area, wherein the cursor is moved in a particular direction specified by the second user action, and projecting graphical user interfaces of a first display area to the one-handed operation area, wherein the first display area is located within a predetermined range around the first target position;

detecting a fourth user action when the electronic device is in a zoom mode, wherein the fourth action comprises a third contact and movement of the third contact, wherein position of the second contact is located at an edge of the one-handed operation area; and wherein when the fourth user action is detected, adjusting display size of objects in user interface in the one-handed operation area.

2. The electronic device of claim 1, wherein the single touch operation is a single sliding touch operation.

3. The electronic device of claim 1, wherein the first predefined user action comprises a first contact with the touch-sensitive display and movement of the first contact on the touch-sensitive display, wherein the instructions of detecting a first predefined user action on the touch-sensitive display further comprise:

detecting a position of the first contact and determining whether the position is located within a predetermined edge area of the touch-sensitive display; and detecting the movement of the first contact and determining whether the movement of the first contact is into a predetermined display area of the touch-sensitive display.

4. The electronic device of claim 3, wherein an initial position of the cursor is located at an intersection between a path of the first predefined user action and border of the predetermined display area.

5. A interface control method configured for one-hand operation comprising:

at an electronic device comprising a touch-sensitive display:

detecting a first predefined user action on the touch-sensitive display;

wherein when the first predefined user action is detected, defining a one-handed operation area on the touch-sensitive display and displaying a cursor located outside the one-handed operation area;

detecting a second user action on the touch-sensitive display, wherein the first predefined user action and the second user action are defined by two consecutive actions in a single touch operation; and wherein when the second user action is detected, moving the cursor from an initial position to a first target position located outside the one-handed operation area, wherein the cursor is moved in a particular direction specified by the second user action, and projecting graphical user interfaces of a first display area to the one-handed operation area, wherein the first display area is located within a predetermined range around the first target position;

detecting a fourth user action when the electronic device is in a zoom mode, wherein the fourth action comprises a third contact and movement of the third contact, wherein position of the second contact is located at an edge of the one-handed operation area; and wherein when the fourth user action is detected, adjusting display size of objects in user interface in the one-handed operation area.

6. The method of claim 5, wherein the single touch operation is a single sliding touch operation.

7. The method of claim 5, wherein the first predefined user action comprises a first contact with the touch-sensitive display and movement of the first contact on the touch-sensitive display, wherein the instructions of detecting a first predefined user action on the touch-sensitive display further comprises:

detecting a position of the first contact and determining whether the position is within a predetermined edge area of the touch-sensitive display; and detecting the movement of the first contact and determining whether the movement of the first contact is into a predetermined display area of the touch-sensitive display.

8. The method of claim 7, wherein the initial position of the cursor is located at an intersection between a path of the first predefined user action and border of the predetermined display area.

* * * * *